Figure 1:
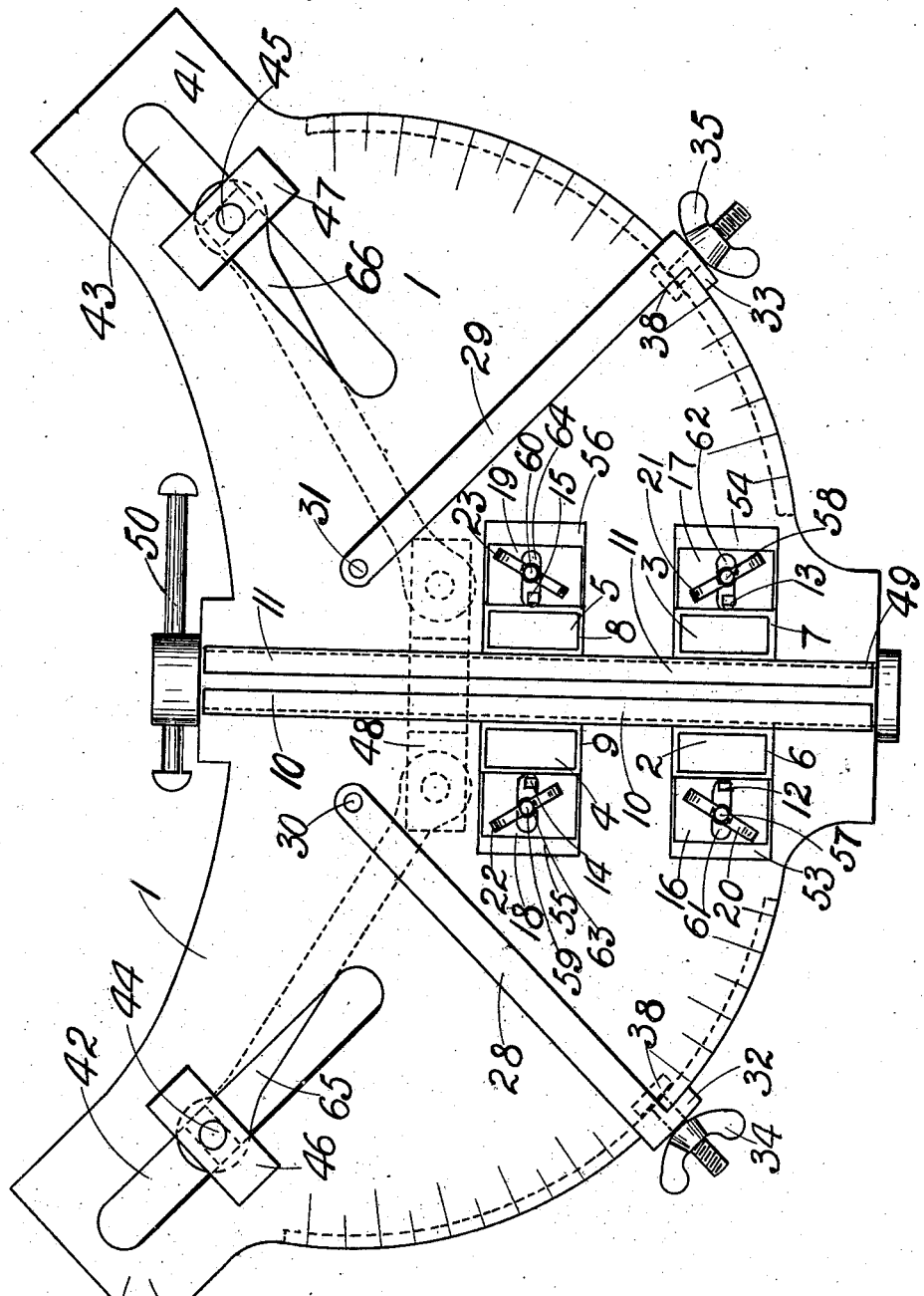

No. 857,345. PATENTED JUNE 18, 1907.
H. HILL & J. BLAIN.
COMBINED MITER BOX AND CRAMP.
APPLICATION FILED DEC. 31, 1906.

2 SHEETS—SHEET 1.

WITNESSES
W. P. Burke
Alvin J. White

INVENTORS
Harry Hill
James Blain
by McMillan ...
ATTY.

No. 857,345. PATENTED JUNE 18, 1907.
H. HILL & J. BLAIN.
COMBINED MITER BOX AND CRAMP.
APPLICATION FILED DEC. 31, 1906.
2 SHEETS—SHEET 2.
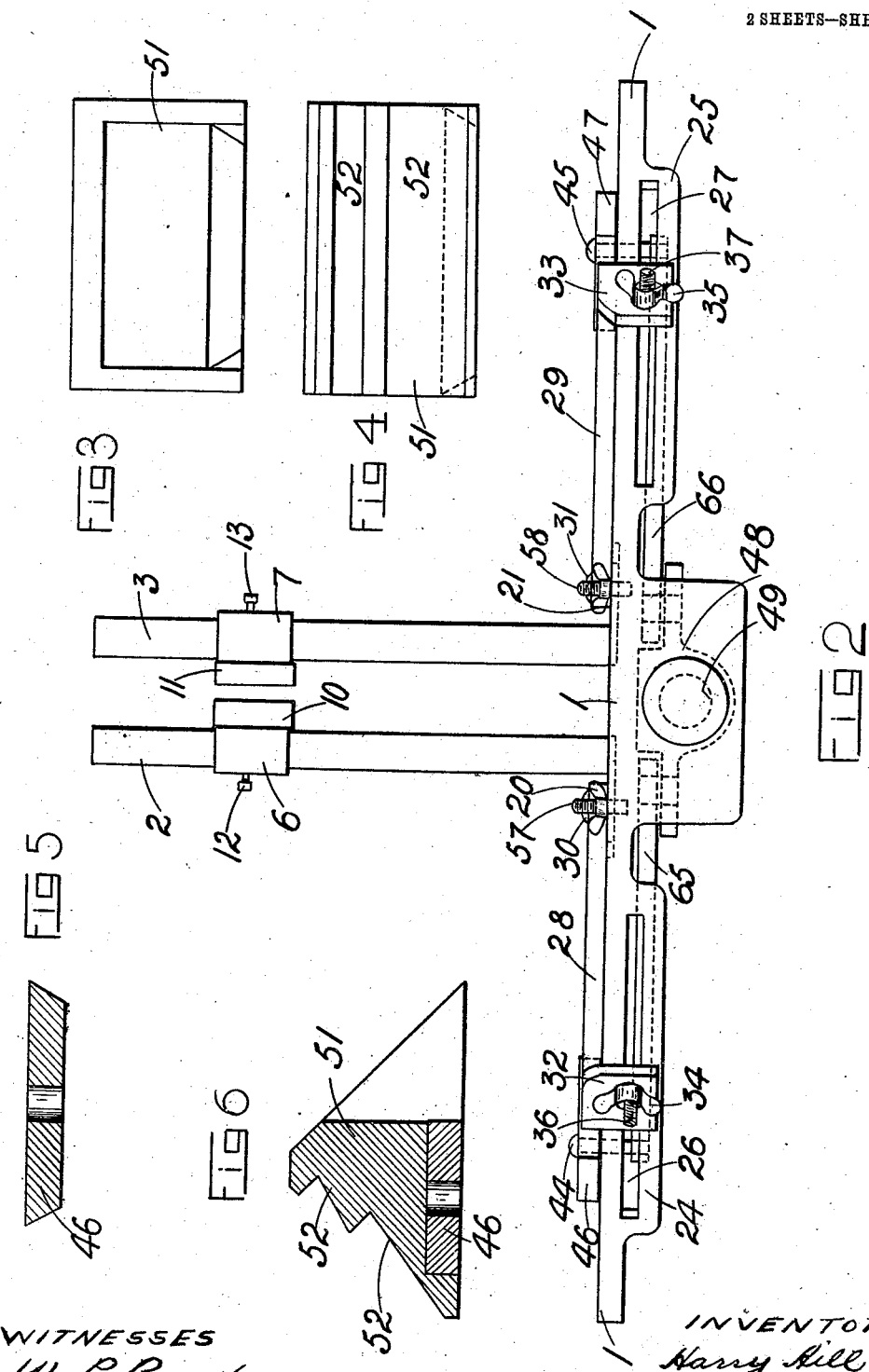

UNITED STATES PATENT OFFICE.

HARRY HILL AND JAMES BLAIN, OF DUNEDIN, NEW ZEALAND.

COMBINED MITER-BOX AND CRAMP.

No. 857,345.           Specification of Letters Patent.           Patented June 18, 1907.

Application filed December 31, 1906. Serial No. 350,262.

*To all whom it may concern:*

Be it known that we, HARRY HILL and JAMES BLAIN, both of 54 Hanover street, Dunedin, New Zealand, have invented certain new and useful Improvements in a Combined Miter-Box and Cramp, of which the following is a specification.

Our invention relates to the class of combined miter boxes and cramps for making picture frames and the like, comprising a baseplate provided with adjustable fences and screw-actuated clamps for holding the molding against the fences to be cut by a saw working in vertical guides on the base plate, the strips of molding after cutting being clamped together on the base plate for the purpose of nailing.

Our invention consists in an improved miter box and cramp, of this class, which is specially adapted for cutting dished frames, and in which the saw guides are adjustable vertically and laterally to take any size saw, the adjusting means for the fences and clamps are out of the way of moldings placed in the device, and the clamps are operated by means of a single screw.

Our invention is illustrated in the accompanying drawings in which similar numerals of reference indicate similar parts and in which Figure 1 is a plan of our invention. Fig. 2 is an end elevation. Fig. 3 is a back view of a wedge piece for use when cutting dished frames. Fig. 4 is a front view of a wedge piece. Fig. 5 is a transverse cross section of one of the clamps. Fig. 6 is a cross sectional detail view of a wedge piece fitted on a clamp.

According to our invention there is a base plate (1) having mounted centrally across it the saw guides, which consist of preferably four uprights (2) (3) (4) (5) placed two at each side of the path of the saw and carrying sliding brackets (6) (7) (8) (9) fitted with horizontal strips of wood or the like (10) (11) to guide and protect the saw. These brackets are vertically slidable on the uprights and are adapted to be clamped in position by means of set screws (12) (13) (14) (15). The uprights are also made laterally adjustable by being provided with footpieces (16) (17) (18) (19) which slide in recesses (53) (54) (55) (56) formed in the base plate (1) and are fixed in the desired position by wingnuts (20) (21) (22) (23) engaging studs (57) (58) (59) (60) tapped into holes formed in the baseplate the foot-pieces being provided with slots (61) (62) (63) (64) to enable their lateral adjustment.

At each side of the saw guides the back edge of the baseplate (1) is formed with a flange (24) (25) longitudinally slotted (26) (27) and curved to form an arc of a circle, the inner ends of the adjustable fences (28) (29) being pivoted (30) (31) on the base plate at a point corresponding to the center of such circles at each side of the saw guides. The outer ends (32) (33) of the fences (28) (29) are turned down at right angles over the flanges (24) (25) of the base plate (1) and the fences are adapted to be fixed at a desired position by means of thumbnuts (34) (35) engaging threaded pins (36) (37) which slide in slots (26) (27) and project through holes in the outer ends of the fences, the pins being provided at their inner ends with nuts (38) (38). A graduated scale is marked on the edge of the base plate (1) at each side (see Fig. 1) to facilitate adjustment of the fences (28) (29) to any desired angle. The base plate has two side extensions (40) (41) with longitudinal slots (42) (43) therein, in which travel pins (44) (45) on which are pivoted the clamps (46) (47) one at each side of the saw guides. The clamps are preferably rectangular and are dovetailed in transverse cross-section as shown in Fig. 5. The pins (44) (45) project downward through the slots (42) (43) and are pivoted to arms (65) (66) which extend under the base plate (1) and are pivoted to a nut (48) traveling on a central screw (49) suitable journaled beneath the base plate (1). The end of this screw (49) is provided with a handle (50) by which it is operated so as to draw the clamps (46) (47) backward from or forward to the fences (28) (29) on the baseplate.

For the purpose of cutting dished frames, wedge-pieces (51) are provided for the clamps (46) (47) adapted to fit over and be held thereon, and with stepped faces (52) to support the moldings in the tilted position. The wedges are readily slipped off when it is desired to cut flat frames.

In operation the fences are set to the desired angle, and one piece of the molding is laid against one fence, clamped up, cut by a suitable saw, and removed. The other molding is similarly treated. The two moldings are then placed against the fences with their cut surfaces joined and are clamped up tightly and nailed together.

Having now described our invention, what we claim as new and desire to secure by Letters Patent is:—

1. A miter box and cramp comprising in combination a baseplate having side extensions with slots therein, saw guides mounted centrally across said baseplate, adjustable fences pivoted on said baseplate, means for clamping said fences in desired position, a central screw journaled beneath said baseplate and provided with an operating handle, a nut traveling on said screw, clamps pivoted to pins projecting through and traveling in the slots in said extensions, and arms extending beneath said basepiece pivoted at one end to said nut and at the other end to said pins substantially as described.

2. A miter box and cramp comprising in combination a baseplate having its back edges formed as arcs of circles and having side extensions with slots therein, saw guides mounted centrally across said baseplate, longitudinally slotted flanges formed on said back edges of said baseplate, adjustable fences pivoted at their inner ends on said baseplate at points corresponding to the centers of said circles and having their outer ends turned down over said flanges, means on the adjustable fences for engaging the slots for clamping said ends to said flanges, a central screw journaled beneath said base plate and provided with an operating handle, a nut traveling on said screw, clamps pivoted to pins projecting through and traveling in the slots in said side extensions and arms extending beneath said basepieces pivoted at one end to said nut and at the other end to said pins substantially as described.

3. A miter box and cramp comprising in combination a baseplate having its back edges formed as arcs of circles and having side extensions with slots therein, sawguides mounted centrally across said baseplate, said sawguides consisting of a pair of uprights at each side of the sawpath carrying adjustable sliding brackets fitted with strips of wood or the like said uprights having footpieces sliding laterally and adjustable in recesses formed in said baseplate, longitudinally slotted flanges formed on said back edges of said baseplate, adjustable fences pivoted at their inner ends on said baseplate at points corresponding to the centers of said circles and having their outer ends turned down over said flanges, means on the adjustable fences for engaging the slots for clamping said ends to said flanges, a central screw journaled beneath said baseplate and provided with an operating handle, a nut traveling on said screw, clamps pivoted to pins projecting through and traveling in the slots in said side extensions and arms extending beneath said baseplate pivoted at one end to said nut and at the other end to said pins substantially as described.

4. A miter box and cramp comprising in combination a baseplate having its back edges formed as arcs of circles and having side extensions with slots therein, saw guides mounted centrally across said baseplate said sawguides consisting of a pair of uprights at each side of the sawpath carrying adjustable sliding brackets fitted with strips of wood or the like said uprights having also foot pieces sliding laterally and adjustable in recesses formed in said baseplate, longitudinally slotted flanges formed on said back edges of said baseplate, adjustable fences pivoted at their inner ends on said baseplate at points corresponding to the centers of said circles, and having their outer ends turned down over said flanges, means on the adjustable fences for engaging the slots for clamping said ends to said flanges, a central screw journaled beneath said baseplate and provided with an operating handle, a nut traveling on said screw, clamps pivoted to pins projecting through and traveling in the slots in said side extensions, arms extending beneath said baseplate pivoted at one end to said nut and at the other end to said pins and wedgepieces with stepped outer faces adapted to fit on said clamps substantially as described.

In testimony whereof we have signed our names to this specification in the presence of two subscribing witnesses.

HARRY HILL.
JAMES BLAIN

Witnesses:
ANDREW JOHN PARK,
JOHN RUTHERFORD PARK.